United States Patent

Kietzer et al.

[15] 3,699,462

[45] Oct. 17, 1972

[54] CHANNEL COMBINING CIRCUIT FOR SYNCHRONOUS PHASE DETECTION SYSTEMS

[72] Inventors: James E. Kietzer, Chicago; Joseph N. Mente, South Holland, both of Ill.

[73] Assignee: The United States of America as represented by the Secretary of Navy

[22] Filed: June 1, 1971

[21] Appl. No.: 148,564

[52] U.S. Cl. ..................329/112, 307/232, 328/134, 328/155, 329/50

[51] Int. Cl. ..........................................H03d 3/18

[58] Field of Search................329/50, 112, 204, 120; 328/166, 133, 155, 134; 307/232, 233, 295; 325/349, 487; 178/5.45 D

[56] References Cited

UNITED STATES PATENTS

| | | | |
|---|---|---|---|
| 3,103,633 | 9/1963 | Hartog | 307/232 X |
| 3,184,608 | 5/1965 | Goldfarb | 328/133 X |
| 3,165,704 | 1/1965 | Shacknow | 328/166 |
| 3,621,406 | 11/1971 | Paine | 307/295 X |

*Primary Examiner*—Alfred L. Brody
*Attorney*—R. S. Sciascia, J. A. Cooke, R. J. Erickson and D. McGiehan

[57] ABSTRACT

A channel combining circuit for homodyne receivers or other systems employing synchronous detection, which selects the output of either an in-phase detector or a quadrature phase detector. Each of two channels has an inverter circuit and two diodes making available at a common output terminal the most positive signal derived from either a positive or negative input signal from the detectors.

6 Claims, 1 Drawing Figure

PATENTED OCT 17 1972 3,699,462
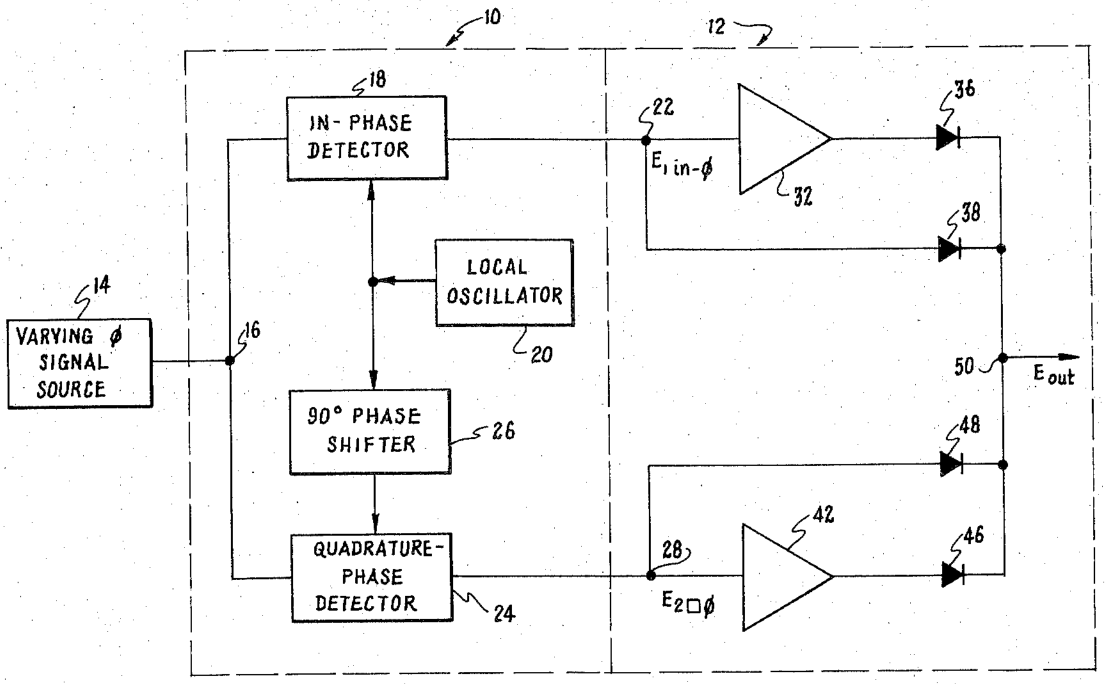
INVENTORS
James E. Kietzer
Joseph N. Mente
BY J. A. Cooke ATTORNEY
Donn McGiehan AGENT

CHANNEL COMBINING CIRCUIT FOR SYNCHRONOUS PHASE DETECTION SYSTEMS

BACKGROUND OF THE INVENTION

This invention relates to channel combining circuits for homodyne receivers and more particularly to a dual signal combiner wherein the output is the most positive of a quadrature phase or an in-phase input signal.

In homodyne receivers and other synchronous detection systems, where the input signal has varying or unknown phase, it has been common practice to use two detectors with injected local oscillator signal inputs separated by 90°. These detectors are referred to as "in-phase" and "quadrature phase." The magnitude of the detector output will be varying from zero to maximum but there never can be a situation when both outputs are simultaneously down more than 3 decibel from maximum, because of the 90° phase shift between the local oscillator input to each detector.

Since only a single output proportional to input signal amplitude is desired, some means for combining the two detector outputs is necessary. This combining has been accomplished in the past by a circuit that squares the detector outputs, adds the squares, thence takes the square-root of the total. This method of combining theoretically gives an output proportional to the actual input signal level regardless of phase. While squaring and rooting is not too difficult, wideband signals require complex circuitry and accuracy is not high.

SUMMARY OF THE INVENTION

Accordingly, an object of the instant invention is to provide an improved channel combining circuit for synchronous detection systems.

Another object of the instant invention is to provide a simplified channel combining circuit utilizing relatively few electronic components.

A further object of the instant invention is to provide a channel combining circuit wherein the signal outputs from two detectors having different phase relationship are combined to produce the most positive potential output.

Briefly, these and other objects of the instant invention are attained by utilizing two parallel circuits each comprising an operational amplifier and two diodes. The amplifiers invert the polarity of a signal at unity gain, and one diode connected in series between the amplifier output and the signal output terminal conducts positive potential only. The other diode connected in parallel across the amplifier-diode series combination, discussed above, conducts only the positive potentials arriving before the amplifier input. By this novel and simple arrangement, only the most positive potential signal will arrive at the output terminal of the circuit.

BRIEF DESCRIPTION OF THE DRAWING

A more complete understanding of the invention and many of the attendant advantages thereof will be readily appreciated as the same becomes better understood by reference to the following description when considered in connection with the accompanying drawing wherein the sole FIGURE is a circuit schematic view of a phase combining circuit including a detector circuit and a channel combining circuit according to the present invention.

DESCRIPTION OF THE PREFERRED EMBODIMENT

Referring now to the drawing, there is shown generally a phase channel combining circuit including a detector circuit 10 and a channel combining circuit 12. A signal source 14, produces and delivers an unknown and varying phase a.c. signal to a terminal 16 which is common to the inputs of an in-phase detector 18 and a quadrature phase detector 24.

Also connected to detector 18 and injecting a signal directly thereto, is a local oscillator 20, operating at a fixed frequency. The output of local oscillator 20 is also injected into detector 24 through a conventional 90° phase-shifter 26. Detector 18 provides a varying a.c. in-phase signal to a terminal 22, and detector 24 provides a varying a.c. quadrature phase signal to a terminal 28.

The in-phase signal $E_1$ at terminal 22 is conducted to an operational amplifier 32 and the anode of a diode 38. The output of operational amplifier 32 is connected to the anode of a diode 36. The cathodes of diodes 36 and diode 38 are connected ultimately to an output terminal 50.

Similarly, the quadrature-phase signal $E_2$ at terminal 28 is conducted to an operational amplifier 42 and the anode of a diode 48. The output of operational amplifier 42 is connected to the anode of a diode 46. The cathodes of diode 46 and diode 48 connect ultimately to output terminal 50.

The operation of the circuit will be more clearly understood by reference to the following.

Detectors 18 and 24 are similar in operation and act on each input signal to produce an output only when the detector is keyed "on" by the signal from a local oscillator 20, in the case of inphase detector 18, or the signal from a 90° phase shifter 26 in the case of the quadrature detector 24. If the local oscillator 20 produces a square-wave, each detector is "on" only during the injection of the positive half-cycle of the square wave. Therefore, the detector output signal is the half-cycle portion of the input signal which occurs during the period the detector is keyed "on." The portion passed by each detector depends on the phase angle difference between the input signal and the injected local oscillator signal or the injected 90° phase-shifted signal.

The resultant detected signal $E_1$ at terminal 22 is an in-phase signal having a half-cycle or 180° duration. At any one point in time, it is of a certain amplitude and sign depending on phase angle of the source signal. Similarly, the resultant detected signal $E_2$ at terminal 28 is a quadrature phase signal having a half-cycle or 180° duration, but shifted 90° out-of-phase from the signal at terminal 22. Again, at any one point in time, it has a certain amplitude and sign depending on the phase angle of the source signal.

The $E_1$ signal at terminal 22 and he $E_2$ signal at terminal 28 are available for combining at the operational amplifiers 32 and 42 and diodes 38 and 48 in the following manner. When $E_1$ is positive, the operational amplifier 32, inverts it to a negative signal of the same amplitude and impresses it upon diode 36. This negative signal will not be conducted by diode 36. That positive $E_1$ signal is also impressed upon diode 38 which may conduct it to the output terminal 50 under certain conditions, to be explained later. Similarly, when $E_2$ at terminal 28 is positive, inverter amplifier 42 changes it to a negative signal, and diode 46 will not conduct it. That positive $E_2$ signal applied also to diode 48 may be conducted to output terminal 50 if certain conditions are met. As will be obvious, only one of diodes 38 or 48 will conduct, depending on which receives the higher amplitude, to produce E out at terminal 50. The other diode of 38 or 48 will be back-biased and therefor not conducting. Thus, in the aforementioned case, only the most positive signal of $E_1$ and $E_2$ will be conducted to output terminal 50, and is designated E out.

Considering the case where the $E_1$ signal is negative, diode 38 will not conduct, and amplifier 32 will change $E_1$ to a positive signal which will be conducted by diode 36 if the voltage E out at terminal 50 produced by $E_2$ is not higher to back-bias diode 36. Similarly, where the $E_2$ signal is negative, diode 48 will not conduct, amplifier 42 will invert $E_2$ to a positive signal which will be conducted by diode 46 if voltage $E_1$ at terminal 50 is not already higher to thus back-bias diode 46.

As can be seen from the above discussion, E out will always be a positive signal, derived from either $E_1$ or $E_2$, depending on which has the greater amplitude. Furthermore, when the signal from the source 14 is at a phase angle of 45°, the instantaneous detected signal, $E_1$, at terminal 22 will be 3db down from the maximum. Similarly, the instantaneous detected signal $E_2$ at terminal 28 will also be 3 db down from maximum. When these equal amplitude signals are processed in the channel combining circuit 12, no back-biasing of the diodes occurs, both signals are passed, and the signal E out at output terminal 50 will be a combination of $E_1$ and $E_2$ and thus only 3 db down from the maximum signal.

Obviously numerous modifications and variations of the present invention are possible in light of the above teachings. It is therefore to be understood that within the scope of the appended claims the invention may be practiced otherwise when as specificaly described.

What is new and desired to be claimed by Letters Patent of the United States is:

1. A signal channel combining circuit to produce a maximum positive polarity signal at the output comprising:
   - a varying phase signal source;
   - a pair of phase detectors providing an in-phase output signal and a quadrature phase output signal respectively, both coupled to said varying phase signal source;
   - a local oscillator injecting a signal into said pair of phase detectors;
   - a phase shifter interposed electrically between said local oscillator and one of said pair of phase detectors;
   - a pair of phase inverter amplifiers each coupled to the output of a respective one of said phase detectors,
   - a first pair of diodes each connected respectively to the output of one of said amplifiers; and
   - a second pair of diodes each connected in parallel to a respective one of the series combinations of said amplifier and said first diode, and the outputs of all of said diodes being coupled to a common output terminal.

2. The signal channel combining circuit of claim 1 wherein:
   - said first pair of diodes have their cathodes connected to the common output terminal.

3. The signal channel combining circuit of claim 1 wherein:
   - said second pair of diodes have their cathodes connected to the common output terminal.

4. An improved dual channel combining circuit for combining an in-phase varying signal with a quadrature-phase varying signal developed by combining a varying phase input signal with locally oscillated and phase shifted signals in phase detectors to provide an output of the most positive polarity, comprising:
   - first means for inverting the polarity of the in-phase signal,
   - first unidirectional conduction means connected in series between said first inverting means and the output of the circuit,
   - second unidirectional conduction means connected in parallel with the series combination of said first inverting means and said first unidirectional conduction means,
   - second means for inverting the polarity of the quadrature phase signal,
   - third unidirectional conduction means connected in series with said second inverting means and the output of the circuit, and
   - fourth unidirectional conduction means in parallel with the series combination of said second inverting means and said third unidirectional conduction means.

5. The improved dual channel combining circuit of claim 4 wherein:
   - all said unidirectional conduction means are diodes.

6. The improved dual channel combining circuit of claim 5 wherein:
   - all said unidirection conduction means conduct positive signals only to the output of the circuit.

* * * * *